(12) United States Patent
Howey

(10) Patent No.: US 8,364,651 B2
(45) Date of Patent: Jan. 29, 2013

(54) APPARATUS, SYSTEM, AND METHOD FOR IDENTIFYING REDUNDANCY AND CONSOLIDATION OPPORTUNITIES IN DATABASES AND APPLICATION SYSTEMS

(75) Inventor: Richard Howey, St. Paul, MN (US)

(73) Assignee: OptumInsight, Inc., Eden Prairie, MN (US)

( * ) Notice: Subject to any disclaimer, the term of this patent is extended or adjusted under 35 U.S.C. 154(b) by 354 days.

(21) Appl. No.: 12/853,902

(22) Filed: Aug. 10, 2010

(65) Prior Publication Data

US 2011/0055167 A1    Mar. 3, 2011

Related U.S. Application Data

(60) Provisional application No. 61/237,937, filed on Aug. 28, 2009.

(51) Int. Cl.
*G06F 7/06* (2006.01)

(52) U.S. Cl. .................. 707/692; 707/809; 707/810

(58) Field of Classification Search .................. None
See application file for complete search history.

(56) References Cited

U.S. PATENT DOCUMENTS

| | | | | |
|---|---|---|---|---|
| 6,381,601 | B1 * | 4/2002 | Fujiwara et al. | 707/692 |
| 2004/0059736 | A1 * | 3/2004 | Willse et al. | 707/100 |
| 2009/0037488 | A1 * | 2/2009 | Abrams | 707/201 |

OTHER PUBLICATIONS

"Data-Flow Anti-patterns: Discovering Data-Flow Errors in Workflows," by Trcka et al. In: Lecture Notes in Computer Science, 2009, vol. 5565/2009, 425-439. Available at: SpringerLink.*

"An Integrated Approach to Teaching Requirements Modelling," by Allen and Semmens. In: Lecture Notes in Computer Science, 1995, vol. 895/1995, 223-237. Available at: SpringerLink.*

"What Makes a Good Data Model? Evaluating Quality of Entity Relationship Models," by Moody, Daniel. In: Lecture Notes in Computer Science, 1994, vol. 881/1994, 94-111. Available at: SpringerLink.*

Silverston, *The Data Model Resource Book: a library of universal data models by industry type*, vol. 2, John Wiley & Sons, Inc., Mar. 2001.

* cited by examiner

*Primary Examiner* — Neveen Abel Jalil
*Assistant Examiner* — Daniel Kinsaul
(74) *Attorney, Agent, or Firm* — Fulbright & Jaworski L.L.P.

(57) ABSTRACT

Apparatuses, computer program products, and methods for identifying redundancy and consolidation opportunities in databases and application systems are disclosed. In one embodiment, the apparatus may include at least one meta data scanner. The apparatus may also include an enterprise meta data source. The apparatus may further include a meta data repository. The meta data repository receives system-specific meta data from the at least one meta data scanner. The meta data repository may also receive enterprise canonical data model meta data from the enterprise meta data source. The meta data repository may be configured to generate at least one individual system CRUD matrix that may then used to produce an enterprise canonical model CRUD matrix. The enterprise canonical model CRUD matrix may be analyzed by a data mining clustering algorithm. The clustering algorithm may group together modules and database elements that may be redundant and may indicate opportunities for consolidation.

16 Claims, 10 Drawing Sheets

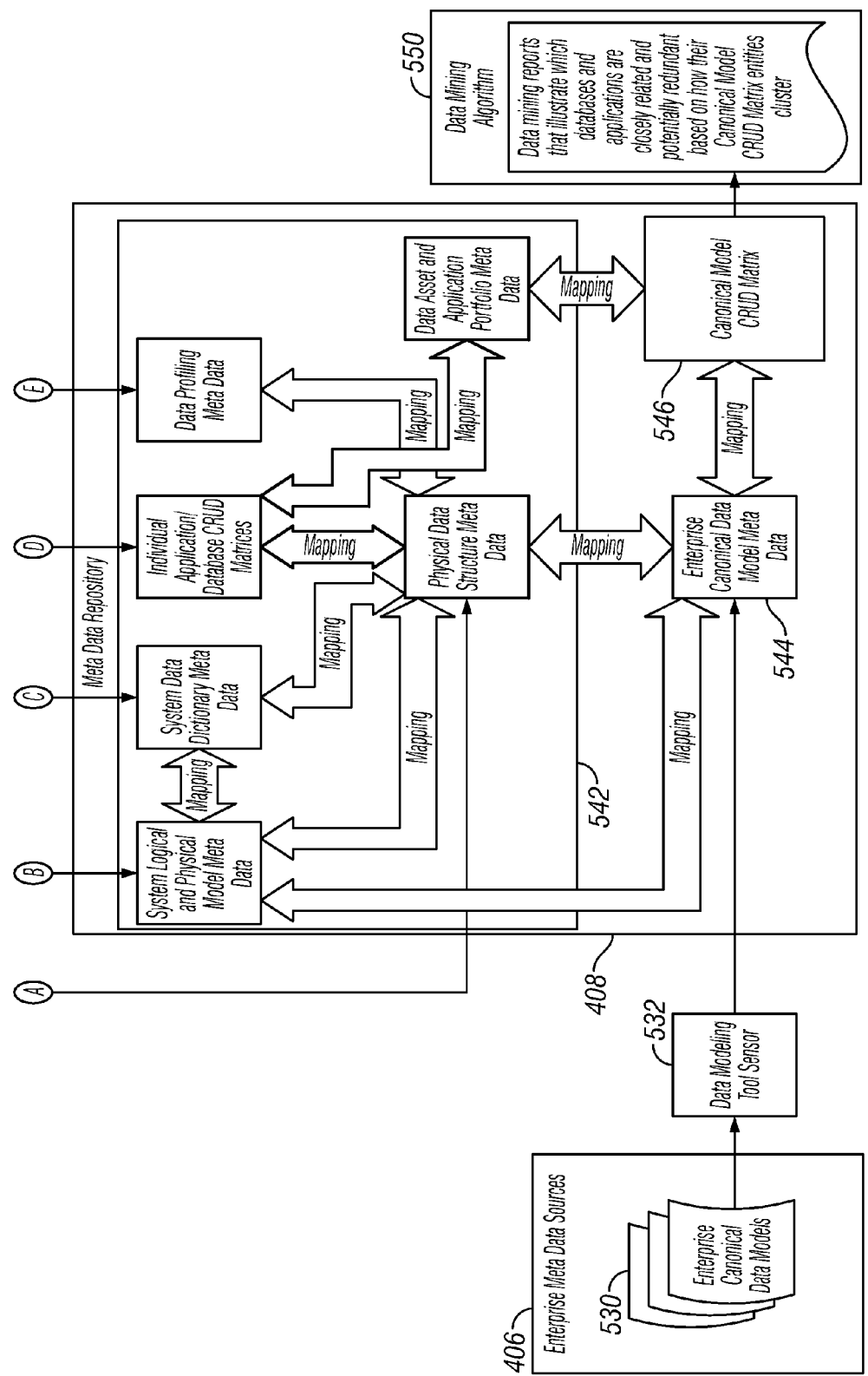
FIG. 5A (Con't)

750

|  | Data Element 1.1 | Data Element 1.2 | Data Element 1.3 |
|---|---|---|---|
| Application Module 1.1 | CR  772 |  |  |
| Application Module 1.2 | D | U | CRUD  774 |
| Application Module 1.3 | D |  |  |

|  | DataElement 2.1 | Data Element 2.2 | DataElement 2.3 |
|---|---|---|---|
| Application Module 2.1 | U | D  776 | CRUD |
| Application Module 2.2 | R | U |  |

| 700 → | Canonical Data Element 1 702 | Canonical Data Element 2 704 | Canonical Data Element 3 706 | Canonical Data Element 4 708 |
|---|---|---|---|---|
| Application Module 1.1  710 | CR | | | |
| Application Module 1.2  712 | D | CRUD  720 | U | |
| Application Module 1.3  714 | D | | | |
| Application Module 2.1  716 | D | CRUD | U  722 | |
| Application Module 2.2  718 | U | | R | |

FIG. 7C

APPARATUS, SYSTEM, AND METHOD FOR IDENTIFYING REDUNDANCY AND CONSOLIDATION OPPORTUNITIES IN DATABASES AND APPLICATION SYSTEMS

CROSS-REFERENCE TO RELATED APPLICATIONS

This application claims priority to U.S. Provisional Application No. 61/237,937 filed Aug. 28, 2009, the entire contents of which is specifically incorporated herein by reference without disclaimer.

BACKGROUND OF THE INVENTION

1. Field of the Invention

This invention relates to databases and more particularly relates to an apparatus, system, and method for identifying database and application system redundancy.

2. Description of the Related Art

Redundancy in an enterprise's databases and application systems increases with the number of databases and application systems in the enterprise. That is, some information may be represented more than once in a database. Additionally, similar data may be represented multiple ways in several databases throughout the enterprise. Having information stored as multiple representations and/or multiple times in an enterprise reduces operating efficiency when executing queries for data. Multiple application systems may access and process the information in the enterprise databases. These application systems provide similar or redundant functionality, which is expensive to maintain. Additionally, demand on storage systems increases with the amount of redundant data. Further, design of software for accessing the databases and training of employees for operating the software becomes more challenging as data and application system redundancy increases.

Database and application system redundancy often results after merging two companies. For example, when a company merges with a second company, both companies may have separate databases that include information about clients, employees, orders, and/or other information. After the first company and the second company merge, a search request to find a client queries both the first company's databases and the second company's databases. These queries may use different application systems that were separately implemented by the two companies. The same occurs when executing queries for employees, orders, and other information. As the number of databases grows, for example through mergers, the complexity of operating the databases increases. Increasing complexity results in added costs from hosting and storing multiple databases, modifying software for accessing the databases, and training of employees in operating the modified software.

Previously, identifying redundancy involved comparing databases and application systems two at a time against each other. The databases and application systems are manually compared to identify redundancy and opportunities for consolidation. With this approach, as the number of databases and application systems grows, the number of possible pairs of databases and application systems for comparison increases exponentially. For example, for N databases $(N^2-N)/2$ pairs are compared to identify redundancy between each of the databases. One technique for implementing this approach may be placing all of the data elements of each database in a spreadsheet and manually comparing each line of the spreadsheet. For large numbers of databases this approach becomes difficult to implement.

The referenced shortcomings are not intended to be exhaustive, but rather are among many that tend to impair the effectiveness of previously known techniques in database and application system management; however, those mentioned here are sufficient to demonstrate that the methodologies appearing in the art have not been satisfactory and that a significant need exists for the techniques described and claimed in this disclosure.

SUMMARY OF THE INVENTION

From the foregoing discussion, it should be apparent that a need exists for an apparatus, system, and method for identifying redundancy and opportunities for consolidation in database and application systems.

An apparatus for identifying redundancy is presented. In one embodiment, the apparatus includes at least one meta data scanner. The apparatus also includes an enterprise meta data source. The apparatus yet also includes a meta data repository. The meta data repository receives system-specific meta data representative of the databases and application systems from the at least one meta data scanner. The meta data repository also receives enterprise canonical data model meta data from the enterprise meta data source. The meta data repository is configured to generate at least one individual system CRUD ("Create," "Read," "Update," "Delete") matrix and an enterprise canonical model CRUD matrix.

A computer program product comprising a computer readable medium having computer usable program code executable to perform operations for identifying redundancy in application modules is also presented. The computer program product includes computer usable program code for loading enterprise canonical data model meta data representative of an enterprise canonical data model into a meta data repository. The computer program product also includes computer usable program code for loading system-specific meta data representative of the databases and application systems into the meta data repository. The computer program further includes populating an individual system CRUD matrix from the system-specific meta data. The computer program product further includes computer usable program code for mapping data elements of the system-specific meta data with data elements of the enterprise canonical data model meta data. The computer program product also includes computer usable program code for populating an enterprise canonical model CRUD matrix from the individual system CRUD matrix and the mapping. The computer program product yet also includes computer usable program code for analyzing the enterprise canonical model CRUD matrix to identify redundancy in the databases and application systems.

A method is also presented for identifying redundancy. The method in the disclosed embodiments substantially includes the steps necessary to carry out the functions presented above with respect to the operation of the described apparatus and system. In one embodiment, the method includes loading enterprise canonical data model meta data representative of an enterprise canonical data model into a meta data repository. The method also includes loading system-specific meta data representative of the databases and application systems into the meta data repository. The method further includes populating at least one individual system CRUD matrix from the system-specific meta data. The method also includes mapping the system-specific meta data to the enterprise canonical data model meta data. The method further includes populating an enterprise canonical model CRUD matrix from the at least one individual system CRUD matrix and the mapping. The method yet also includes analyzing the enterprise canonical model CRUD matrix to identify redundancy in the databases and application systems.

The term "canonical" is defined as describing a data model having at least one of entity, relationship, or attribute that is independent of any specific system implementation.

The term "CRUD matrix" is defined as a matrix that defines what program elements create (C), read (R), update (U), and/or delete (D) data elements The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 7A is an illustration of an individual system CRUD matrix according to one embodiment.

FIG. 7B is another illustration of an individual system CRUD matrix according to one embodiment.

FIG. 7C is an illustration of an enterprise canonical model CRUD matrix according to one embodiment.

DETAILED DESCRIPTION

Figure 1:
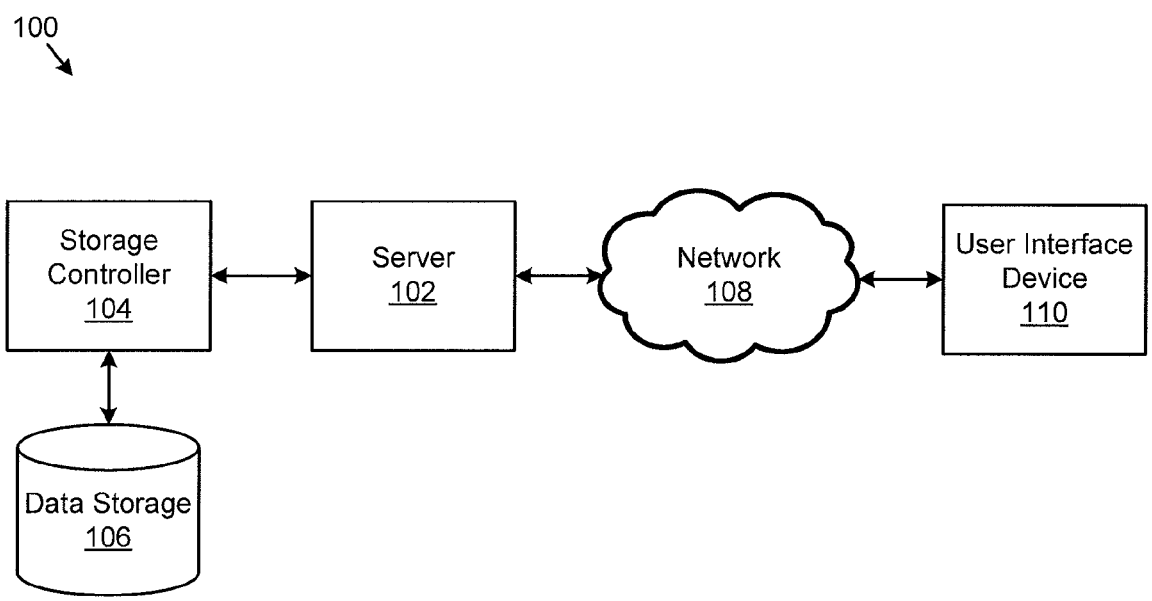
FIG. 1 is a schematic block diagram illustrating one embodiment of an exemplary system for identifying redundancy in databases and application systems according to one embodiment.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules, in order to more particularly emphasize their implementation independence. A module is "[a] self-contained hardware or software component that interacts with a larger system." Alan Freedman, "The Computer Glossary" 268 (8th ed. 1998). A module comprises a machine or machines executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A structured method for identifying redundant elements in large numbers of databases and redundancy in applications so that the redundancy may be reduced reduces overall operating cost and complexity of accessing data in the databases and maintaining the applications.

FIG. 1 illustrates one embodiment of a system 100 for identifying redundancy and consolidation opportunities in databases and application systems. The system 100 may include a server 102, a data storage device 106, a network 108, and a user interface device 110. In a further embodiment, the system 100 may include a storage controller 104, or storage server configured to manage data communications between the data storage device 106, and the server 102 or other components in communication with the network 108. In an alternative embodiment, the storage controller 104 may be coupled to the network 108. In a general embodiment, the system 100 may identify redundancy and/or opportunities for consolidation in databases and application systems. Specifically, the system 100 may load into a meta data repository meta data representative of the databases and application systems and generate individual system and enterprise canonical model CRUD matrices. The CRUD matrices may identify redundancy and/or opportunities for consolidation in the databases and application systems.

In one embodiment, the user interface device 110 is referred to broadly and is intended to encompass a suitable processor-based device such as a desktop computer, a laptop computer, a Personal Digital Assistant (PDA), a mobile communication device or organizer device having access to the network 108. In a further embodiment, the user interface device 110 may access the Internet to access a web application or web service hosted by the server 102 and provide a user interface for enabling a user to enter or receive information. For example, the user may enter locations of databases and application systems, enterprise canonical data models, and/or mappings of individual elements in the databases and application systems to the enterprise canonical data models. A canonical data model is a representation of common data elements independent of any specific application.

The network 108 may facilitate communications of data between the server 102 and the user interface device 110. The network 108 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the server 102 is configured to load enterprise canonical data model meta data representative of the enterprise canonical data models into a meta data repository, load system-specific meta data representative of databases and application systems into the meta data repository, build an individual system CRUD matrix, map data elements of the databases to the enterprise canonical data models, build an enterprise canonical model CRUD matrix, and identify redundancy in the databases and application systems from the enterprise canonical model CRUD matrix. Additionally, the server may access data stored in the data storage device 106 via a Storage Area Network (SAN) connection, a LAN, a data bus, or the like.

The data storage device 106 may include a hard disk, including hard disks arranged in an Redundant Array of Independent Disks (RAID) array, a tape storage drive comprising a magnetic tape data storage device, an optical storage device, or the like. In one embodiment, the data storage device 106 may store health related data, such as insurance claims data, consumer data, or the like. The data may be arranged in a database and accessible through Structured Query Language (SQL) queries, or other data base query languages or operations.

Figure 2:
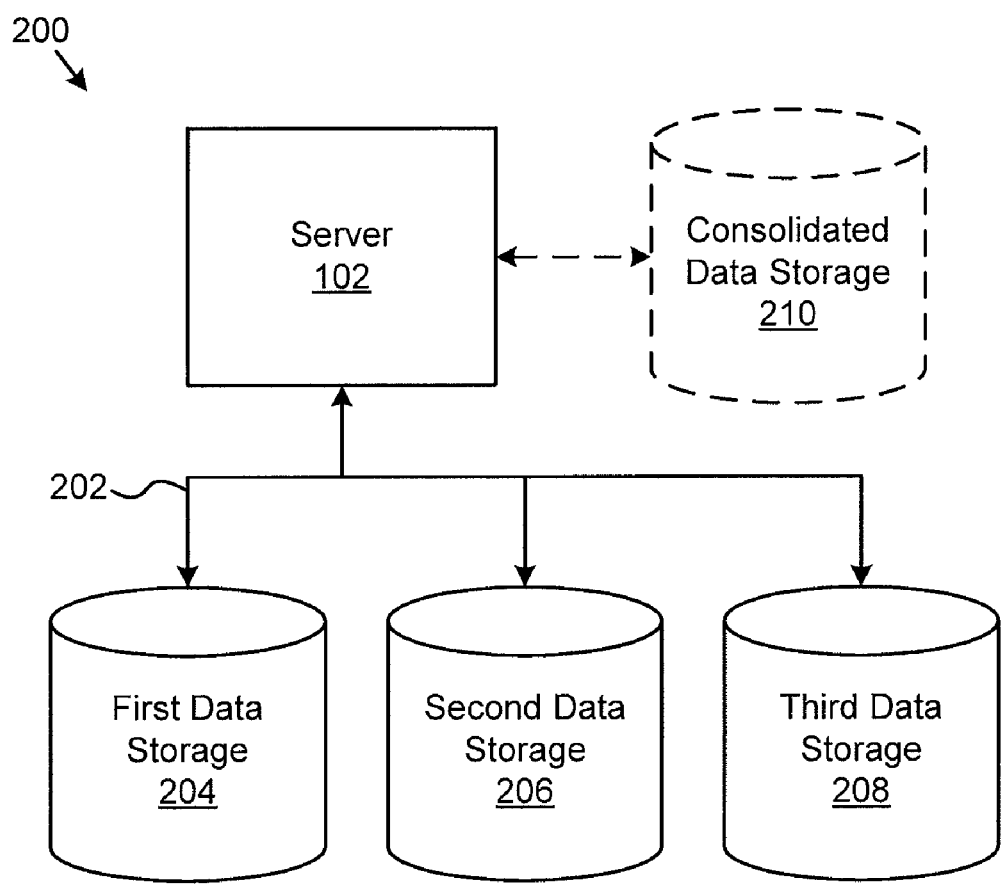
FIG. 2 is a schematic block diagram illustrating one embodiment of an exemplary database system that potentially contains redundant data in multiple databases and for storing system-specific meta data, enterprise meta data, individual system CRUD matrices, and/or enterprise canonical model CRUD matrices according to one embodiment.

FIG. 2 illustrates one embodiment of a data management system 200 configured to store and manage data for identifying redundancy and/or opportunities for consolidation in databases and application systems. For example, the data management system 200 may store enterprise canonical data model meta data, system-specific meta data, individual system CRUD matrices, and/or enterprise canonical model CRUD matrices. In one embodiment, the data management system 200 may include a server 102. The server 102 may be coupled to a data-bus 202. In one embodiment, the data management system 200 may also include a first data storage device 204, a second data storage device 206, and/or a third data storage device 208. In further embodiments, the data management system 200 may include additional data storage devices (not shown). In such an embodiment, each data storage device 204, 206, 208 may each host a separate database that may, in conjunction with the other databases, contain redundant data. Alternatively, the storage devices 204, 206, 208 may be arranged in a RAID configuration for storing a database or databases through may contain redundant data.

In one embodiment, the server 102 may submit a query to selected data storage devices 204, 206 to collect a consolidated set of data elements associated with an individual or group of individuals. The server 102 may store the consolidated data set in a consolidated data storage device 210. In such an embodiment, the server 102 may refer back to the consolidated data storage device 210 to obtain a set of data elements associated with a specified individual. Alternatively, the server 102 may query each of the data storage devices 204, 206, 208 independently or in a distributed query to obtain the set of data elements associated with a specified individual. In another alternative embodiment, multiple databases may be stored on a single consolidated data storage device 210.

In various embodiments, the server 102 may communicate with the data storage devices 204, 206, 208, 210 over the data-bus 202. The data-bus 202 may comprise a SAN, a LAN, or the like. The communication infrastructure may include Ethernet, Fibre-Chanel Arbitrated Loop (FC-AL), Small Computer System Interface (SCSI), and/or other similar data communication schemes associated with data storage and communication. For example, the server 102 may communicate indirectly with the data storage devices 204, 206, 208, 210; the server 102 first communicating with a storage server or the storage controller 104.

In one example of the data management system 200, the first data storage device 204 may store data associated with insurance claims made by one or more individuals. The insurance claims data may include data associated with medical services, procedures, and prescriptions utilized by the individual. In one particular embodiment, the first data storage device 204 included insurance claims data for over 56 million customers of a health insurance company. The database included claims data spanning over 14 years. Of those 56 million members, 26 million had a five year history or more. In one embodiment, individuals suffering from a common illness may be aggregated to identify many, if not all, of the possible decisions points and their resulting outcomes related to the progression of the disease.

In one embodiment, the second data storage device 206 may store summary data associated with the individual. The summary data may include one or more diagnoses of conditions from which the individual suffers and/or actuarial data associated with an estimated cost in medical services that the individual is likely to incur. The third data storage device 208 may store customer service and program service usage data associated with the individual. For example, the third data storage device 208 may include data associated with the individual's interaction or transactions on a website, calls to a customer service line, or utilization of a preventative medicine health program. A fourth data storage device (not shown) may store marketing data. For example, the marketing data may include information relating to the individual's income, race or ethnicity, credit ratings, etc. In one embodiment, the marketing database may include marketing information available from a commercial direct marketing data provider.

The server 102 may host a software application configured for identifying redundancy and consolidation opportunities. The software application may further include modules for interfacing with the data storage devices 204, 206, 208, 210, interfacing a network 108, interfacing with a user through the user interface device 110, and the like. In a further embodiment, the server 102 may host an engine, application plug-in, or application programming interface (API). In another embodiment, the server 102 may host a web service or web accessible software application.

Figure 3:
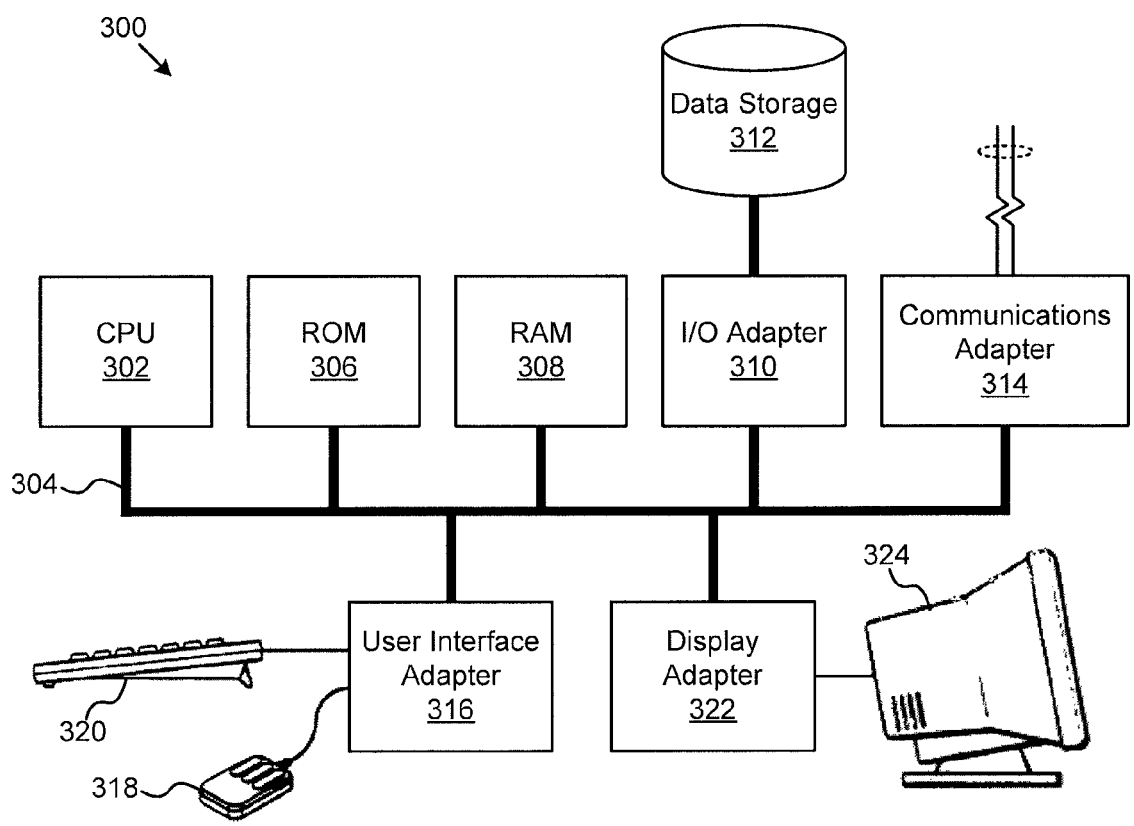
FIG. 3 is a schematic block diagram illustrating one embodiment of an exemplary computer system that may be used in accordance with certain embodiments of the system for identifying redundancy and consolidation opportunities in databases and application systems.

FIG. 3 illustrates a computer system 300 adapted according to certain embodiments of the server 102 and/or the user interface device 110. The central processing unit (CPU) 302 is coupled to the system bus 304. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIG. 6.

The computer system 300 also may include Random Access Memory (RAM) 308, which may be SRAM, DRAM, SDRAM, or the like. The computer system 300 may utilize RAM 308 to store the various data structures used by a software application configured to identifying system redundancy and consolidation opportunities. The computer system 300 may also include Read Only Memory (ROM) 306 which may be PROM, EPROM, EEPROM, optical storage, or the like. The ROM may store configuration information for booting the computer system 300. The RAM 308 and the ROM 306 hold user and system data.

The computer system 300 may also include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 300 in order to input information for obtaining enterprise canonical data models, obtaining descriptions of databases and application systems, and/or obtaining mappings of data elements of the databases and application systems to the enterprise canonical data models. In a further embodiment, the display adapter 322 may display a graphical user interface associated with a software or web-based application for identifying redundancy and/or consolidation opportunities in databases and application systems.

The I/O adapter 310 may connect one or more storage devices 312, such as one or more of a hard drive, a Compact Disk (CD) drive, a floppy disk drive, a tape drive, to the computer system 300. The communications adapter 314 may be adapted to couple the computer system 300 to the network 108, which may be one or more of a LAN, WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of computer system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), computer game consoles, and multi-processor servers. Moreover, the present embodiments may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

Figure 4:
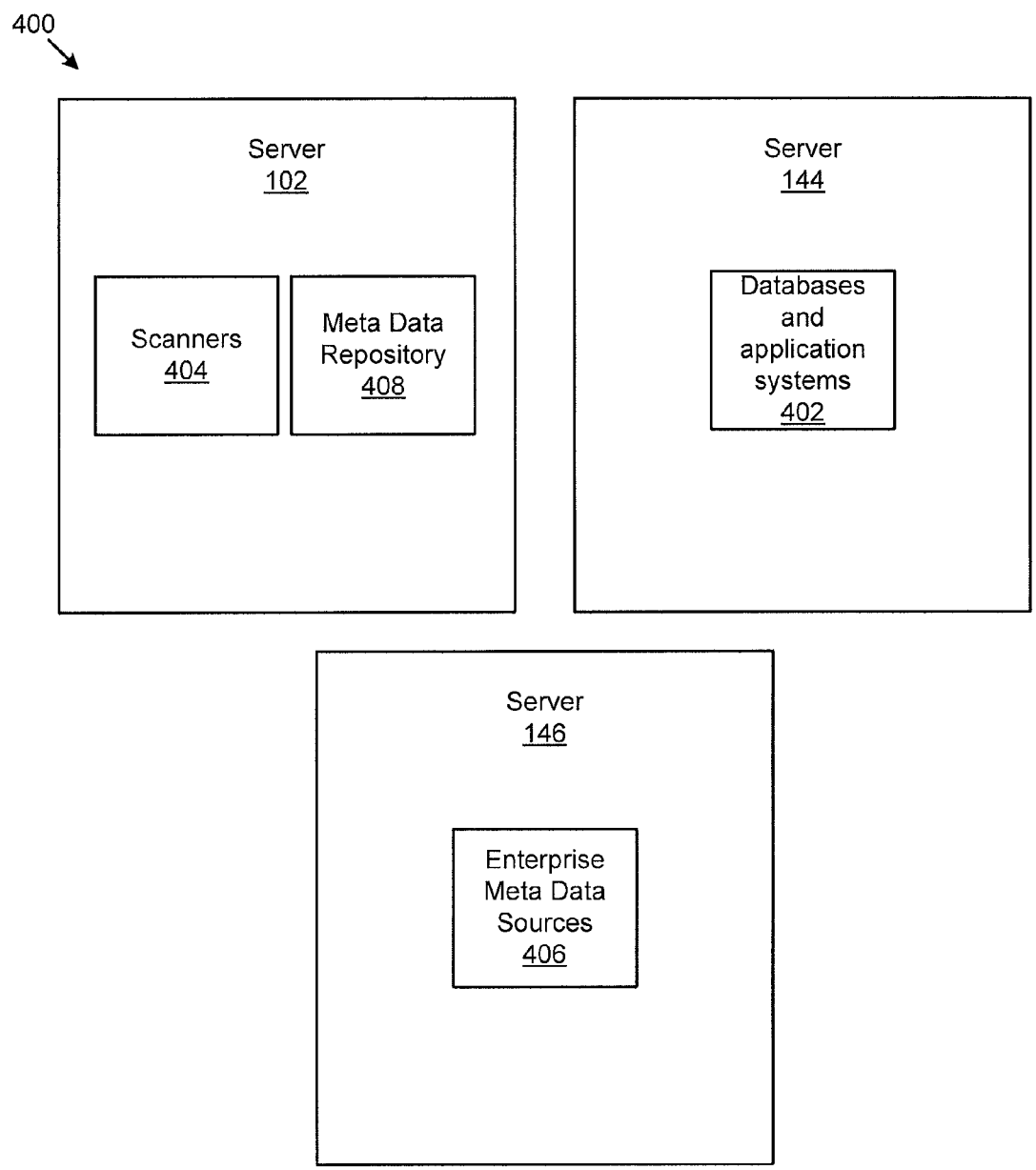
FIG. 4 is a schematic block diagram illustrating one embodiment of an exemplary apparatus for identifying redundancy and consolidation opportunities in databases and application systems according to one embodiment.

FIG. 4 illustrates one embodiment of an apparatus 400 for identifying redundancy and consolidation opportunities in databases and application systems. In one embodiment, the apparatus 400 may include server 102, 144, 146. The server 144 may include databases and application systems 402. Additional servers (not shown) may include additional databases and application systems. The server 102 may include scanners 404 and a meta data repository 408. The scanners 404 scan the databases and application systems 402 and output system-specific meta data representative of the databases and application systems 402 into a meta data repository 408. Further, the server 146 may include enterprise meta data sources 406 including an enterprise canonical data model. The scanners 404 may also scan the enterprise meta data sources 406 and output enterprise meta data to the meta data repository. According to one embodiment, the databases and application systems 402, the enterprise meta data sources 406, the scanners 404, and the meta data repository 408 may reside on servers 144, 146, 102, 102, respectively. However, the enterprise meta data sources 406, the scanners 404, the databases and application systems 402, and the meta data repository 408 may also reside on a single server.

Figure 5A:
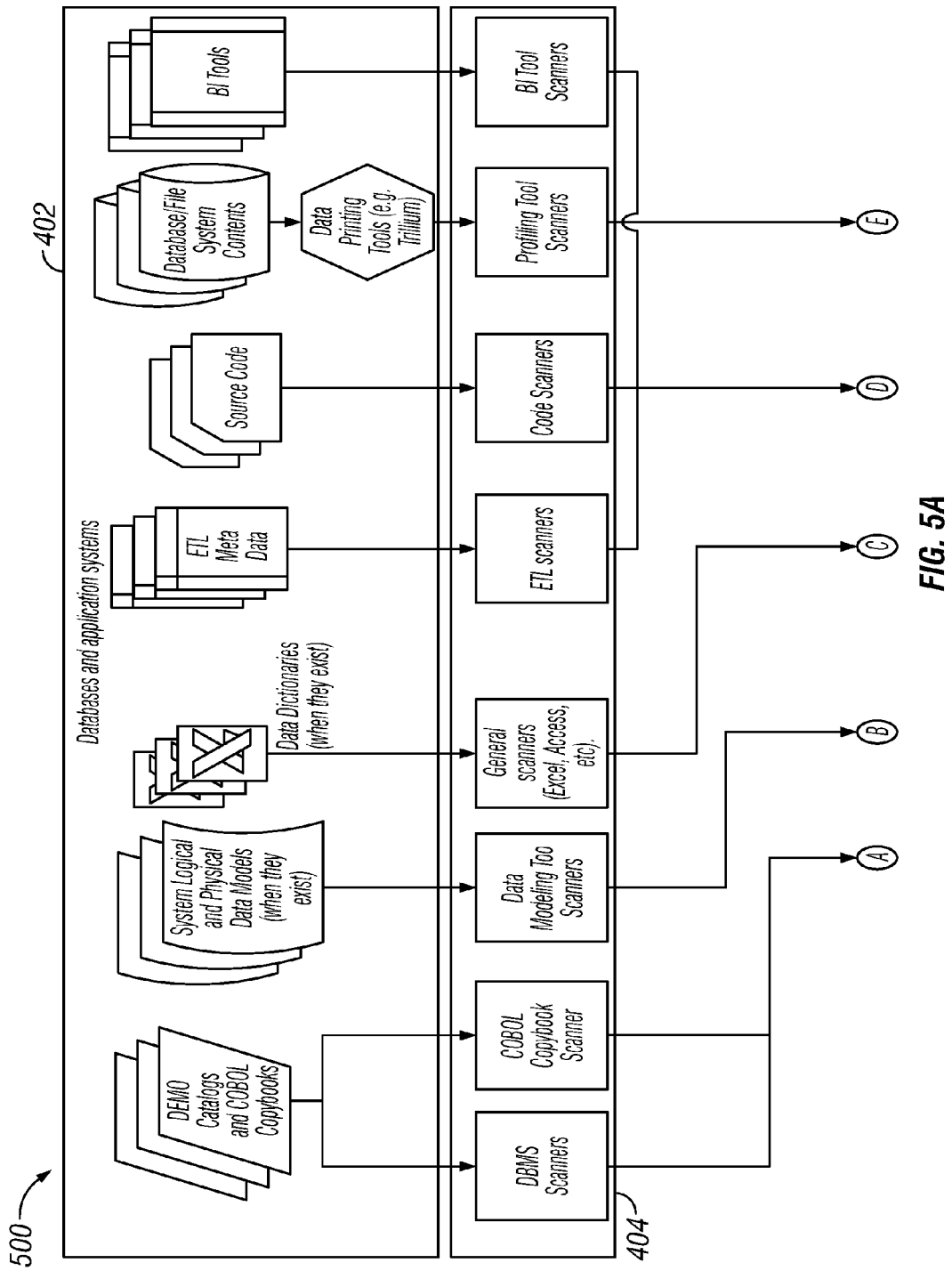
FIG. 5A is a schematic block diagram illustrating one embodiment of an exemplary system for identifying redundancy and consolidation opportunities in databases and application systems according to one embodiment.

FIG. 5A illustrates one embodiment of a system 500 for identifying redundancy and consolidation opportunities in databases and application systems. The system 500 includes databases and application systems 402. The databases and application systems 402 may include, for example, DBMS catalogs, COBOL copybooks, system logical data models, system physical data models, data dictionaries, Extract/Transform/Load (ETL) meta data, source code in various languages, databases, file systems, and Business Intelligence (BI) tools. In addition, the databases and application systems 402 may include application modules. The databases and application systems 402 may be located across physically separated servers or located on a single server. The scanners 404 may receive from the databases and application systems 402 meta data corresponding to each of the databases and application systems 402 such as, for example, data elements in the databases and operations performed by the application modules on each data element in the databases. According to one embodiment, the scanners 404 may include a single scanner for scanning all of the databases and application systems 402. According to another embodiment, the scanners 404 include system-specific scanners. For example, the scanners 404 may include a DBMS scanner, a COBOL copybook scanner, a data modeling tool scanner, a general access scanner, an ETL scanner, a code scanner, a profiling tool scanner, and/or a BI tool scanner. The system-specific meta data 542 in the meta data repository 408 receives meta data representative of the databases and application systems 402 from the scanners 404. The system-specific meta data 542 may also include, for example, system-specific CRUD matrices.

Figure 5B:
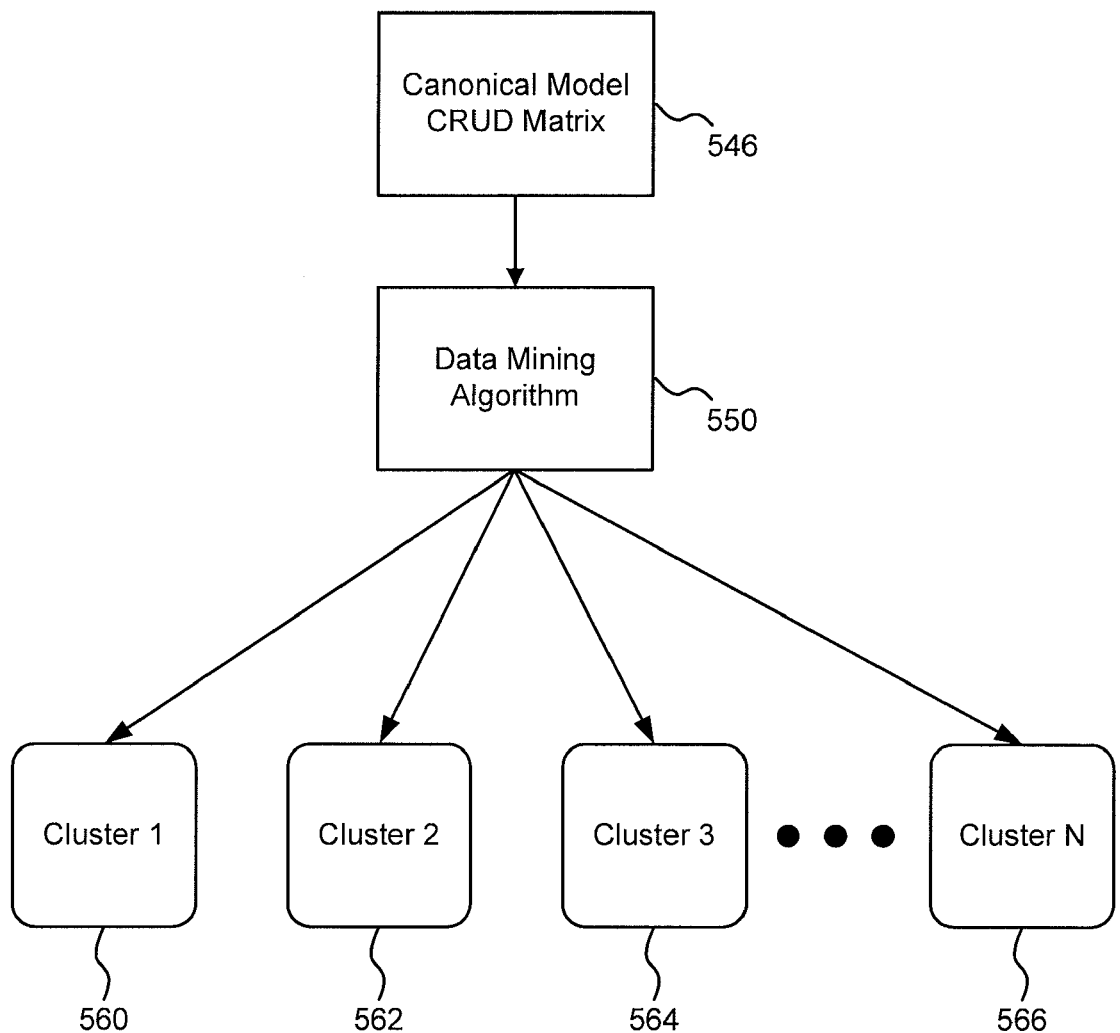
FIG. 5B is a schematic block diagram further illustrating one aspect of one embodiment of an exemplary system for identifying redundancy and consolidation opportunities in databases and application systems according to one embodiment.

The enterprise meta data sources 406 may include enterprise canonical data models 530. A data modeling tool scanner 532 receives data from the enterprise meta data sources 406 and outputs enterprise canonical data model meta data 544 representative of the enterprise canonical data models 530. An enterprise canonical model CRUD matrix 546 in the meta data repository 408 is created from the system-specific meta data 542 and the enterprise canonical data model meta data 544. A data mining algorithm 550 may create a report using, for example, clustering techniques on the enterprise canonical model CRUD matrix 546 identifying redundancy in the databases and application systems 402 and/or opportunities for consolidating databases and application systems 402. FIG. 5B, which illustrates an embodiment of data mining algorithm 550. As shown in the depicted embodiment data minding algorithm 550 create clusters 560, 562, 564, 566 in response to enterprise canonical CRUD matrix 546. The number of clusters—each identifying potential redundancy within the databases and applications—will vary based on the size of the enterprise canonical model CRUD matrix. Certain embodiments of a CRUD matrix may have thousands of rows. Automated data mining techniques may make it easier to analyze particularly large CRUD matrices.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
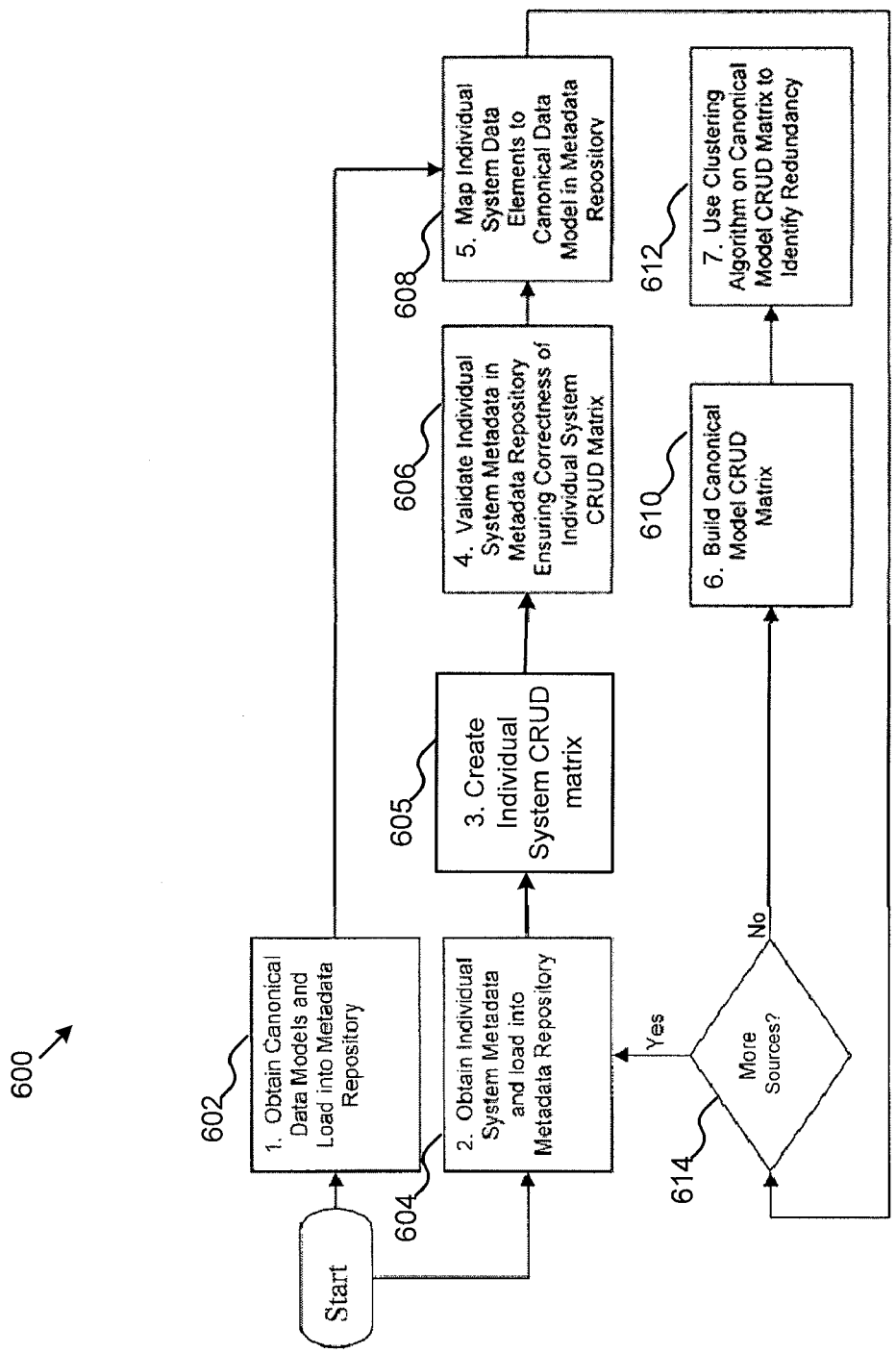
FIG. 6 is a flow chart illustrating an exemplary method for identifying redundancy and consolidation opportunities in databases and application systems according to one embodiment.

FIG. 6 illustrates one embodiment of a method 600 for identifying redundancy and consolidation opportunities in databases and application systems. In one embodiment, the method 600 starts at block 602. At block 602 enterprise canonical data models are obtained and loaded into a meta data repository. An enterprise canonical data model is a representation of common data elements independent of any specific application. The enterprise canonical data models may be obtained, for example, by collecting input from an operator of a user interface device using any one of a number of commercially available data modeling software packages (e.g., Erwin from CA Technologies).

According to one embodiment, enterprise canonical data models for the major subject areas of an enterprise are loaded into the meta data repository. For example, in a health care organization the subject areas may include claims, members, customers, health care encounters, providers, and/or other subject areas. The enterprise canonical data model serves to provide a reference for describing data assets of the enterprise in a common language. An enterprise canonical data model for a customer may include, for example, a first name, last name, social security number, date of birth, and/or other elements.

The method 600 continues at block 604 to obtain system-specific meta data from one database and application system and load the system-specific meta data into the meta data repository. According to one embodiment, the system-specific meta data is obtained by scanners. The system-specific meta data includes information on operations performed by application modules of application systems to create, read, update, and delete each data element of an individual system database. For example, the system-specific meta data may include meta data describing a data asset such as a catalog for a database of the COBOL copybooks used by a COBOL program, logical and/or physical data models of databases, results of profiling a database using a data profiling tool, source code describing how an application processes data, extract/transform/load (ETL) tool meta data indication of data created/read/updated/deleted in ETL jobs, business intelligence tool meta data indicating what data is read from databases and what data is computed or created and published in reports, and/or data dictionaries that give English language definitions of data. According to one embodiment, additional meta data may be added to the system-specific meta data to allow the databases and application systems to be understood by a human.

At block 605, an individual system CRUD matrix is created. An example of an individual CRUD matrix is shown in FIG. 7A. A matrix 750 has columns 752, 754, 756 representing data element 1.1, data element 1.2, and data element 1.3, respectively. The matrix 750 also includes rows 710, 712, 714 representing application module 1.1, application module 1.2, and application module 1.3, respectively. Cells in the matrix 750 indicate the operations the application modules 710, 712, 714 perform on the data elements 752, 754, 756. For example, a cell 772 indicates that the application module 710 performs create (C) and read (R) operations on the data element 752. As another example, a cell 774 indicates that the application module 712 performs create (C), read (R), update (U), and delete (D) operations on the data element 756.

An additional example of an individual CRUD matrix is shown in FIG. 7B. A matrix 760 has columns 762, 764, 766 representing data element 2.1, data element 2.2, and data element 2.3, respectively. The matrix 760 also includes rows 768 and 770 representing application module 2.1 and application module 2.2, respectively. Cells in the matrix 760 also indicate the operations the application modules 716 and 718 perform on the data elements 762, 764, and 766, respectively. For example, cell 776 indicated that the application module 716 performs the delete (D) operating on the data element 764.

The meta data scanners and meta data repository may be provided by commercially available metadata tools such as ASG-Rochade and ASG-Becubic provided by Allen Systems Group (ASG) software solutions and i.Sight from Micro Focus. The CRUD matrices may also be created with similarly commercially available meta data tools.

Turning back to FIG. 6, the method 600 continues at block 606 to validate system-specific meta data from the individual database and application system in the meta data repository. Validation is performed to ensure correctness of the individual CRUD matrix generated at block 605 According to one embodiment, the blocks 604, 605, 606 may be executed in parallel with block 602.

After validation at block 606, the method 600 continues to block 608. At block 608, a mapping is generated for data elements in the individual system CRUD matrix generated at block 605 to the enterprise canonical data model loaded in the meta data repository at block 602. For example, at block 608 a data element in one individual system CRUD matrix named "LName" may be mapped to "last name" in the enterprise canonical data model. In another example, a data element in the individual system CRUD matrix named "SSN" may be mapped to "social security number" in the enterprise canonical data model. According to one embodiment, analysts may generate the mapping. According to another embodiment, the mapping may be generated automatically. For example, an analyst may map the data element 752 of FIG. 7A to an enterprise canonical data element 1, the data element 754 of FIG. 7A to an enterprise canonical data element 3, and the data element 756 of FIG. 7A to an enterprise canonical data element 2.

After data element mapping at block 608 a decision block 614 is reached. At the decision block 614 additional databases and application systems for identifying redundancy and/or consolidation opportunities are identified. If additional databases and application systems are identified, the method 600 continues to block 604 for the next individual system. The method 600 continues through blocks 604, 605, 606, and 608 to obtain system-specific meta data from the additional databases and application systems, validate the meta data from the additional systems, and map data elements of the individual system CRUD matrix to data elements of the enterprise canonical data model for the additional systems. The additional individual system CRUD matrix may include a data element named "NameLast" mapped to "last name" in the enterprise canonical data models. Thus, data elements with different names in individual system CRUD matrices may correspond to the same data element in the enterprise canonical data model. Blocks 604, 605, 606, and 608 are repeated for each additional database and application system. When no additional databases and application systems are identified for identifying redundancy and/or consolidation opportunities the method 600 proceeds to block 610.

For example, an analyst may map multiple data elements to an enterprise canonical data element. Table 1 provides one embodiment mapping data elements 752, 754, 756, 762, 764, and 766 from two individual system CRUD matrices to enterprise canonical data elements.

TABLE 1

Mapping of Data Elements to Canonical Data Elements

| Canonical Data Element | Corresponding Data Elements |
| --- | --- |
| Canonical Data Element 1 | Data Element 1.1 and Data Element 2.2 |
| Canonical Data Element 2 | Data Element 1.3 and Data Element 2.3 |
| Canonical Data Element 3 | Data Element 1.2 and Data Element 2.1 |
| Canonical Data Element 4 | <no corresponding data elements> |

At block 610 an enterprise canonical model CRUD matrix is generated. For example, the CRUD matrix may be generated by combining individual system CRUD matrices from block 605 according to the mapping of block 608. An example of an enterprise canonical model CRUD matrix is shown in FIG. 7C.

FIG. 7C is an illustration of a CRUD matrix according to one embodiment. A CRUD matrix 700 includes columns 702, 704, 706, 708 referring to canonical data element 1, canonical data element 2, canonical data element 3, and canonical data element 4 of the enterprise canonical data model, respectively. Although four canonical data elements are shown in the CRUD matrix 700 more or less data elements may be placed in columns on the CRUD matrix 700. According to one embodiment, the canonical data elements 702, 704, 706, 708 may be elements relating to a customer. For example, the canonical data element 702 may be first name, the canonical data element 704 may be last name, the canonical data element 706 may be a social security number, and the canonical data element 708 may be an age. As described by Table 1 The canonical data elements 702, 704, 706, 708 are mapped, for example, at block 608 to system data elements 752, 754, 756, 762, 764, and 766. In a different embodiment, the data element 752 may be mapped to the canonical data element 702, the data element 754 to the canonical data element 706, and the data element 756 to the canonical data element 704.

The CRUD matrix 700 also includes rows 710, 712, 714, 716, 718 referring to application module 1.1, application module 1.2, application module 1.3, application module 2.1, and application module 2.2, respectively. Although five application modules from two application systems are illustrated on the CRUD matrix 700 more or less application modules may be placed in rows on the CRUD matrix 700. Each of the rows 710, 712, 714, 716, 718 are obtained from individual system CRUD matrices such as the one shown in FIGS. 7A and 7B. According to one embodiment, the application modules 710, 712, 714, 716, 718 may be application modules acquired during a company acquisition.

Each cell in the CRUD matrix 700 indicates operations performed by the application modules 710, 712, 714, 716, 718 to create, read, update, and/or delete one of the canonical data elements 702, 704, 706, 708. For example, a cell 720 indicates operations performed by the application module 712 include creating (C), reading (R), updating (U), and deleting (D) the enterprise canonical data element 704. As another example, a cell 722 indicates operations performed by the application module 716 include updating (U) enterprise canonical data element 706.

Turning back to FIG. 6, after the enterprise canonical model CRUD matrix is constructed at block 610 the method 600 continues to block 612. At block 612, an algorithm operates on the canonical model CRUD matrix generated at block 610 to identify redundancy and/or opportunities for consolidation. According to one embodiment, the algorithm may be a clustering algorithm. A clustering algorithm groups sets of application modules based on similarities in which enterprise canonical data elements the applications modules operate on to create, read, update, and delete. The application modules grouped together are likely to be redundant. For example, SAS or IBM Intelligent Mining software packages may be employed to identify redundancy and/or opportunities for consolidation in application modules. These consolidations may be grouped together to form a cluster—representing application modules that perform similar operations on the same enterprise canonical data elements. These clustered application modules may be candidates for consolidation. Moreover, application modules that are not clustered with other modules may be unique and may be retained.

Turning back to FIG. 7C, according to one embodiment the application module 712 and the application module 716 may be grouped by an algorithm based upon similarities in the CRUD matrix 700. As shown in the CRUD matrix 700, the application module 712 and the application module 716 may perform identical operations on the enterprise canonical data elements 702, 704, 706, 708. Application module 1.2 and application module 2.1 may form a cluster and may provide an opportunity for consolidation. Since both application modules perform similar tasks on the same canonical data elements, they may be redundant. However, application modules may not be identical but still grouped and identified as likely to be redundant.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. An apparatus to identify redundancy in databases and application systems, the apparatus comprising:
    a processor;
    at least one meta data scanner;
    an enterprise meta data source;
    a meta data repository, wherein the meta data repository receives system-specific meta data representative of the databases and application systems from the at least one meta data scanner, and the meta data repository receives enterprise canonical data model meta data from the enterprise meta data source, and
    a clustering algorithm;
    wherein the meta data repository is configured to generate at least one individual system Create, Read, Update, Delete (CRUD) matrix and an enterprise canonical model CRUD matrix,
    wherein the meta data repository is further configured to group similar entries in the enterprise canonical model CRUD matrix according to the clustering algorithm,
    wherein the clustering algorithm is further configured to analyze the enterprise canonical CRUD matrix to identify redundancy in the databases and application systems, and
    wherein the clustering algorithm is further configured to generate a report of at least one of redundancy and opportunities for consolidation in the databases and application systems.

2. The apparatus of claim 1, wherein the at least one meta data scanner comprises multiple system-specific data scanners.

3. The apparatus of claim 2, wherein the at least one meta data scanner comprises at least one of a DBMS scanner, a COBOL scanner, a data modeling scanner, a general scanner, a ETL scanner, a code scanner, a profile tool scanner, and a BI tool scanner.

4. The apparatus of claim 1, further comprising a data modeling tool scanner that generates the enterprise canonical data model meta data from the enterprise meta data source.

5. A computer program product comprising a non-transitory computer readable storage medium storing computer usable program code executable to perform operations for identifying redundancy in databases and application systems, the computer program product comprising:
    computer usable program code for loading enterprise canonical data model meta data representative of an enterprise canonical data model into a meta data repository;
    computer usable program code for loading system-specific meta data representative of the databases and application systems into the meta data repository;
    computer usable program code for populating at least one individual system Create, Read, Update, Delete (CRUD) matrix from the system-specific meta data;
    computer usable program code for mapping data elements of the system-specific meta data with data elements of the enterprise canonical data model meta data;
    computer usable program code for populating an enterprise canonical model CRUD matrix from the at least one individual system CRUD matrix and the mapping;
    computer usable program code for analyzing the enterprise canonical model CRUD matrix to identify redundancy in the databases and application systems,
        wherein the computer usable program code for analyzing the enterprise canonical model CRUD matrix further comprises grouping similar entries in the enterprise canonical model CRUD matrix according to a clustering algorithm; and
    computer usable program code for generating a report of at least one of redundancy and opportunities for consolidation in the databases and application systems.

6. The computer program product of claim 5, wherein the computer usable program code for analyzing the enterprise canonical model CRUD matrix comprises grouping the databases and application systems based on similar operations performed on data elements of the enterprise canonical data model.

7. The computer program product of claim 5, further comprising computer usable program code for validating system-specific meta data.

8. The computer program product of claim 5, wherein the computer usable program code for loading system-specific meta data comprises a scanner for loading system-specific meta data representative of the databases and application systems into the meta data repository.

9. The computer program product of claim 8, further comprising computer usable program code for loading meta data descriptive of the databases and application systems.

10. The computer program product of claim 5, further comprising computer usable program code for generating a report of at least one of redundancy and opportunities for consolidation in the databases and application systems.

11. A method for identifying redundancy in databases and application systems, the method comprising:

loading enterprise canonical data model meta data representative of an enterprise canonical data model into a meta data repository;

loading system-specific meta data representative of the databases and application systems into the meta data repository;

populating at least one individual system Create, Read, Update, Delete (CRUD) matrix from the system-specific meta data;

mapping the system-specific meta data to the enterprise canonical data model meta data;

populating an enterprise canonical model CRUD matrix from the at least one individual system CRUD matrix and the mapping;

analyzing the enterprise canonical model CRUD matrix to identify redundancy in the databases and application systems, wherein analyzing the enterprise canonical model CRUD matrix comprises executing a clustering algorithm; and generating a report of at least one of redundancy and opportunities for consolidation in the databases and application systems after analyzing the enterprise canonical model CRUD matrix.

12. The method of claim 11, grouping the databases and application systems comprises grouping the databases and application systems based on operations performed on data elements of the enterprise canonical data model.

13. The method of claim 11, further comprising validating the system-specific meta data before mapping the system-specific meta data with the enterprise canonical data model meta data.

14. The method of claim 11, wherein loading system-specific meta data comprises scanning the databases and application systems.

15. The method of claim 14, wherein scanning comprises scanning at least one of a DBMS catalog, a COBOL copybook, a system logical data model, a system physical data model, a data dictionary, ETL meta data, source code, a database, a file system, and a BI tool.

16. The method of claim 11, further comprising loading meta data descriptive of the databases and application systems into the meta data repository.

* * * * *

UNITED STATES PATENT AND TRADEMARK OFFICE
CERTIFICATE OF CORRECTION

PATENT NO. : 8,364,651 B2
APPLICATION NO. : 12/853902
DATED : January 29, 2013
INVENTOR(S) : Richard Howey It is certified that error appears in the above-identified patent and that said Letters Patent is hereby corrected as shown below:

Title Page, item (57) Abstract, line 12, delete "may then used" and insert --may then be used-- therefor.

Signed and Sealed this
Twelfth Day of March, 2013

Teresa Stanek Rea
*Acting Director of the United States Patent and Trademark Office*